(12) United States Patent
Subramanian et al.

(10) Patent No.: US 6,655,352 B2
(45) Date of Patent: Dec. 2, 2003

(54) INTEGRATED BOLT TWO-PIECE SLEEVE DESIGN FOR FLAT RESPONSE KNOCK SENSOR

(75) Inventors: Viswanathan Subramanian, El Paso, TX (US); Efren Solis, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/079,385

(22) Filed: Feb. 20, 2002

(65) Prior Publication Data

US 2003/0154957 A1 Aug. 21, 2003

(51) Int. Cl.[7] ............................................. F02P 5/00
(52) U.S. Cl. ............................ 123/406.4; 73/35.01
(58) Field of Search ........................ 123/406.4, 406.37, 123/406.17; 73/35.01, 35.07, 35.11

(56) References Cited

U.S. PATENT DOCUMENTS

| | | | |
|---|---|---|---|
| 5,440,933 A | * | 8/1995 | Brammer et al. .............. 73/756 |
| 5,965,804 A | * | 10/1999 | Sakamoto .................. 73/35.11 |
| 6,220,078 B1 | * | 4/2001 | Brammer et al. .......... 73/35.11 |

* cited by examiner

*Primary Examiner*—Bibhu Mohanty
(74) *Attorney, Agent, or Firm*—Margaret A. Dobrowitsky

(57) ABSTRACT

A mounting fixture for an engine knock sensor is provided. The fixture includes a base and a support member. The support member is joined to the base with a press fit joint. The base includes an aperture and the support member is inserted in the aperture. The support member can be a bolt or a sleeve. The invention can also include a lip, associated with the support member for retaining a spring washer. The spring washer can be deflected between the support member and a knock sensor component for pressing the knock sensor component against the base.

13 Claims, 3 Drawing Sheets

INTEGRATED BOLT TWO-PIECE SLEEVE DESIGN FOR FLAT RESPONSE KNOCK SENSOR

The invention relates to knock sensors, and more specifically to a knock sensor having a two-piece sleeve assembly.

BACKGROUND OF THE INVENTION

Knock sensors are used to detect when an engine is burning fuel in an uneven manner, a condition commonly known as "knocking." Knock sensors are commonly mounted on a vehicle engine block adjacent the intake manifold or a cylinder head, where vibrations associated with knocking are transmitted through the engine block and can be detected by the sensor. Conventional knock sensors include a one-piece sleeve assembly for retaining the sensor components in relative compression. Typical knock sensor components include a piezoelectric transducer disposed between a pair of terminals. The terminals are, in turn, disposed between a pair of insulators. Knock sensors are usually bolted to the engine block using a separate bolt that passes through an aperture formed in the sleeve assembly. The bolt is then received in a threaded bore formed in the engine block. A nut is threaded onto the sleeve assembly and tightened to compress the knock sensor components to a desired load prior to molding.

Manufacture of conventional one-piece knock sensor sleeves can involve substantial machining, including threads for the nut and mating aperture within the sleeve for the bolt. Moreover, because a one-piece sleeve design is typically of T-shaped cross section, material must be removed from a workpiece to form the sleeve assembly.

SUMMARY OF THE INVENTION

A knock sensor according to the present invention to be associated with a vehicle engine includes a base and a support member press-fit into the base to define a sleeve assembly. At least one knock sensor component sheathes a portion of the support member. The support member further includes means associated therewith for maintaining the at least one knock sensor component in a predetermined relationship to the base. The support member can take various forms, including a hollow tube or a bolt-like member.

The maintaining means associated with the support member can include a lip formed on an end of the support member opposite the base and a disk spring positioned between the lip of the support member and the at least one knock sensor component.

The knock sensor of the present invention can include means for securing the sleeve assembly to an engine block. The securing means can be a separate fastener, such as a bolt. Alternatively, the securing means can be integral with the support member, thereby eliminating the need for a separate fastening means to secure the sensor to the engine block.

In another aspect of the invention, an engine control system includes a microprocessor, an ignition system electrically connected to the microprocessor and a knock sensor including a two-piece sleeve assembly electrically connected to the microprocessor. According to the present invention of the engine control system, the two-piece sleeve assembly is defined by a press-fit joint.

According to another aspect of the invention, a method for manufacturing a knock sensor associated with a vehicle engine includes providing a base having an aperture for press-fit engagement with an support member, press-fitting an support member within the aperture of the base to define a sleeve assembly. The method of manufacture can further include placing at least one knock sensor component about the member. The method of manufacture can include providing an support member having means associated therewith for retaining the at least one knock sensor component in a predetermined relationship to the base.

Other applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawing wherein like reference numerals refer to like parts throughout the several views, and wherein.

DESCRIPTION OF THE PREFERRED EMBODIMENT

Figure 1:
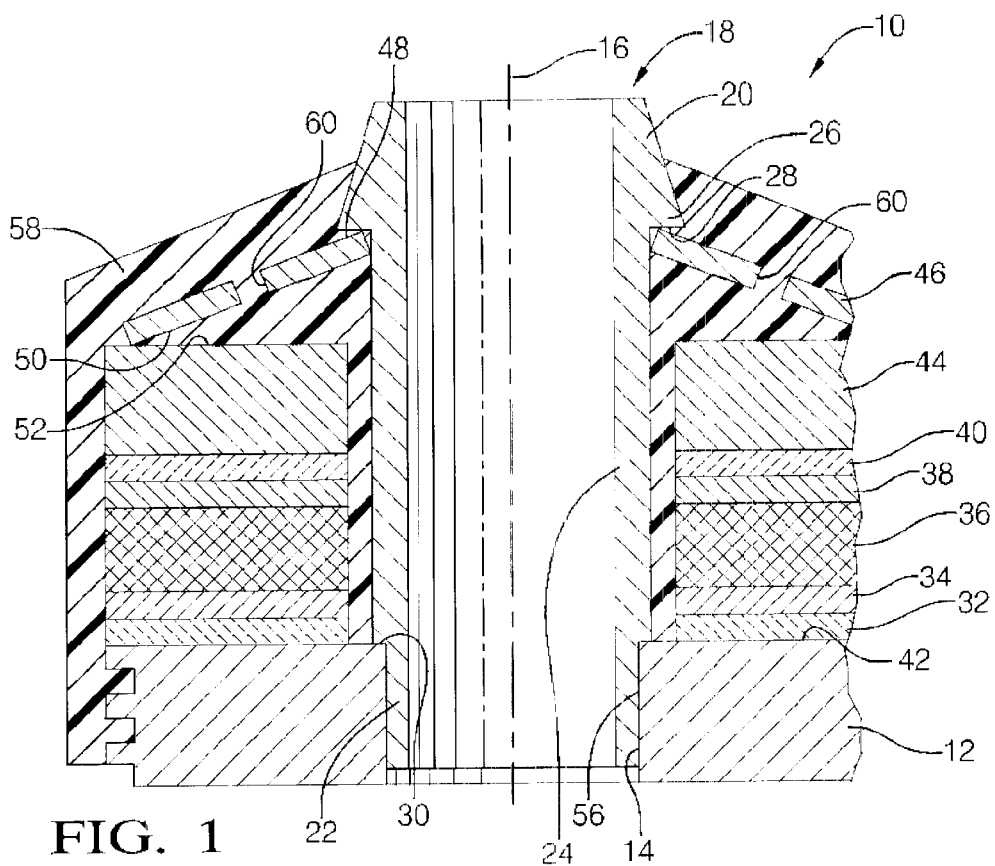
FIG. 1 is a partial cross-sectional view of a first embodiment of a knock sensor according to the invention.

Referring to FIG. 1, a knock sensor 10 associated with a vehicle engine (not shown) includes a base 12 having an aperture 14 formed on an axis 16. The base 12 can have a disk or cylindrical shape, if desired. The axis 16 extends vertically in the illustration of FIG. 1, and can be positioned in the other orientations, if desired.

A support member 18, shown in FIG. 1 as a tube, includes a first end 20, a second end 22 opposite from the first end 20, and a body 24 formed therebetween. The first end 20 of the support member 18, has an outer diameter substantially the same diameter as the outer diameter of the body 24 and includes an annular lip 26 having a surface 28 extending generally radially outward with respect to the vertical axis 16. The second end 22 of the support member 18 has a smaller outer diameter than the outer diameter of the body 24 such that the interface between the second end 22 and the body 24 defines a stop or shoulder 30. The second end 22 of the support member 18 is also slightly tapered or slightly larger in outer diameter than the diameter of the aperture 14 in the base 12 to allow the support member 18 to be press-fit into the aperture 14 of the base 12 along vertical axis 16 with an interference fit.

The base 12 is adapted to support a plurality of disk-shaped knock sensor components, including a first insulator 32, a first terminal 34, a piezoelectric transducer 36, a second terminal 38, and a second insulator 40 supported on an upper surface 42 of the base 12. Operation of the knock sensor 10 is enhanced by maintaining a predetermined compressive force on the piezoelectric transducer 36. A load washer 44 is positioned at one end of the knock sensor components and, in this illustration, adjacent the second insulator 40. A frusto-conical disk spring 46 (known to those skilled in the art as a Belleville washer), is further positioned between the load washer 44 and the lip 26 formed on the first end 20 of the support member 18 to retain the knock sensor components in relative compression. In particular, the disk spring 46 has a first surface 48 for engagement with the surface 28 of the lip 26 and a second surface 50 for engagement with a surface 52 of the load washer 44 to maintain a compressive load on the sensor components.

The base 12 and the support member 18 of the present invention are designed for press fit engagement with one another to define a two-piece sleeve assembly shown generally as 56. In particular, the second end 22 of the support member 18 is pressed into the aperture 14 of the base 12 and a desired number of sensor components can be sheathed onto the support member 18. Since the base 12 and support member 18 are separably joined, the knock sensor 10 of the present invention can be assembled in several ways. For example, the disk spring 46 can be installed over the first end 20 of the member 18, in which case, the spring 46 can include means for reducing the stress about the inner periphery so that the disk spring 46 can be press-fit over lip 26 and snapped into engagement with the surface 28. Belleville washers suitable for this purpose are known to those skilled in the art and can be provided with semi-circular cut-outs or slits radially disposed about the inner periphery of the washer to facilitate placement of the disk over the lip of the support member. An alternative method of assembling the knock sensor 10 can include placing the disk spring 46 over the second end 22 of the support member 18 before press fit engagement between the base 12 and the support member 18, in which case, the disk spring 46 need not include any particular stress-reducing cut-outs or slits.

The disk spring 46 is positioned under the lip 26 of the support member 18. Each disk-shaped component (i.e. the load washer 44, the first insulator 32, the first terminal 34, the transducer 36 the second terminal 38 and second insulator 40) can be stacked encircling the body 24 of the support member 18. Finally, the base 12 can be joined to the support member 18 by press-fitting the second end 22 of the support member 18 into the aperture 14 of the base until the base 12 abuts the shoulder 30, bringing the knock sensor components 32 into operative engagement with one another.

To assist in retaining the components in operative engagement with one another over the life of the knock sensor 10, a plastic housing 58 can be molded over the various elements of the sensor 10. The plastic housing not only inhibits decompression of the disk spring 46 over time but can also protect the integrity of the sensor components. To this end, the disk spring 46 is provided with at least one, but preferably two or more apertures 60 to allow molten plastic to flow around the disk spring 46 to the base 12.

Once the knock sensor base 12 has been press fit with respect to the support member 18, the entire sensor assembly 10 is mountable on an engine block. Such an arrangement is shown in FIG. 3 wherein an outer surface 264 of the base 12 rests on an outer surface 66 of the engine block 62, and separate fastening means 68, shown in FIG. 3 as a bolt, is insertable through an aperture 71 of the support member 218 of the sensor 210 and is threadingly received in a second aperture 72 in the engine block 62.

Figure 2:
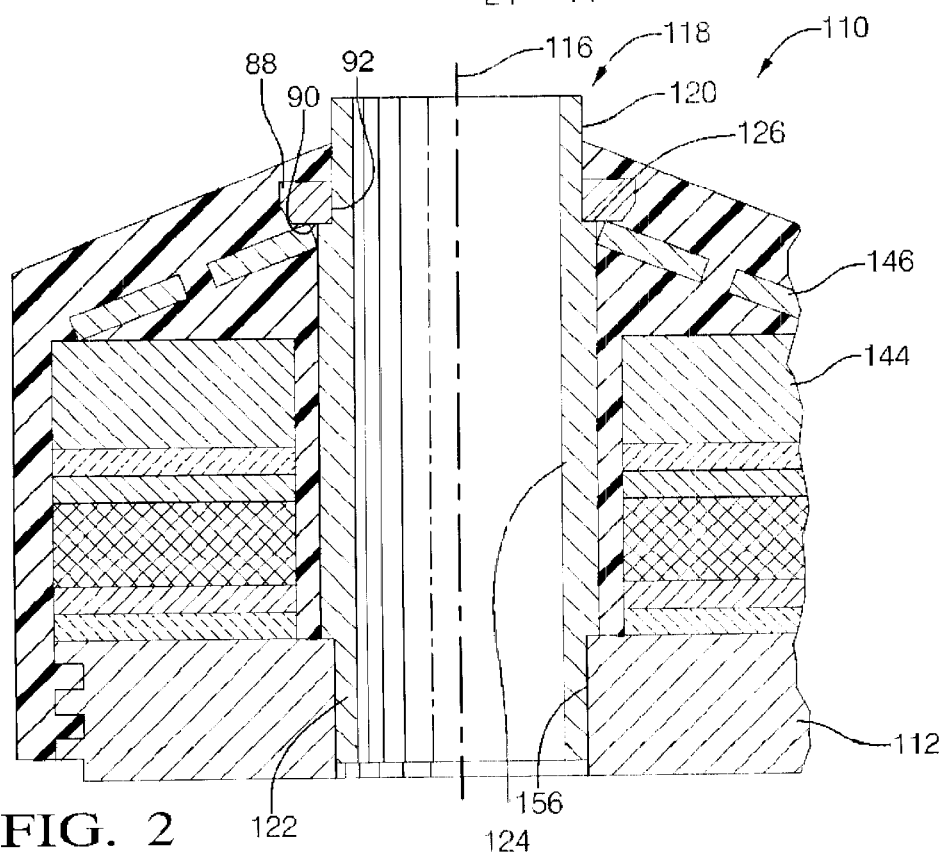
FIG. 2 is a partial cross-sectional view of a second embodiment of a knock sensor according to the invention.

Another advantage to the two-piece sleeve assembly formed with a base and a support member is that the first end of the support member can have various shapes for receiving various means for compressing the knock sensor components. Referring now to FIG. 2, a second embodiment of the present invention is shown wherein a two-piece sleeve assembly is defined by an support member 118 press-fit into a base 112. The support member 118 is shown as a tube having a body 124, a first end 120 and a second end 122. The first end 120 can be opposite the base 112 and have an outer diameter smaller than an outer diameter of the body 124 to define an annular shoulder 126. The annular shoulder 126 supports a spring retention collar 88 having a spring retention face 90 angled away from a central axis 116. The support member 118 and spring retention collar can be engaged at a press fit joint 92. A disk spring 146 can be positioned over the end 120 of the support member 118 and positioned compressed between the spring retention face 90 and the load washer 144. Alternatively, the disk spring 146 can be positioned over an end 122 opposite end 120 before the base 112 and support member 118 are engaged at a press fit joint 156 and after the support member 118 and spring retention collar 88 have been engaged at press fit joint 92. The disk spring 126 provides a compressive force to a plurality of knock sensor components supported on the base 112.

Figure 3:
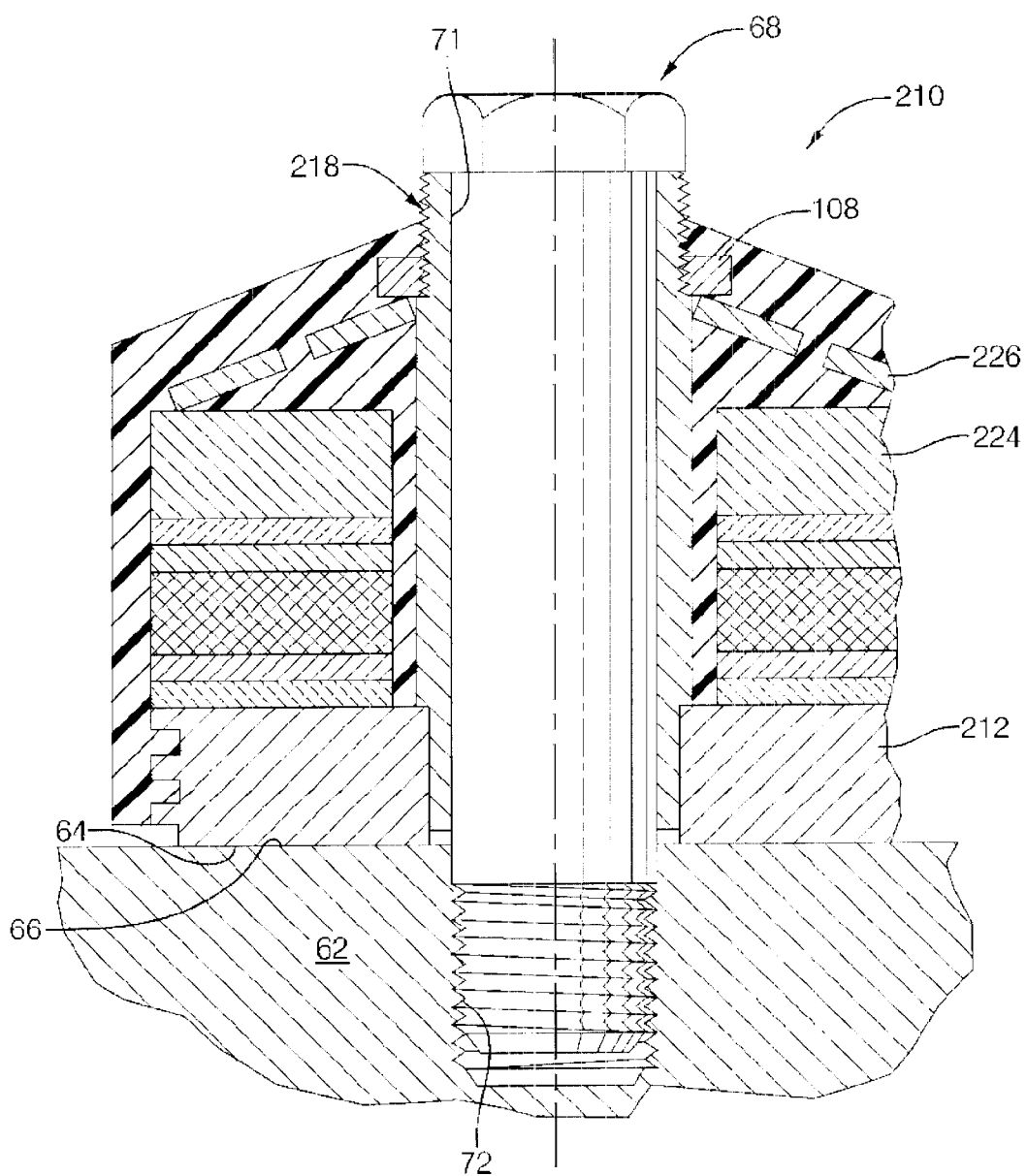
FIG. 3 is a partial cross-sectional view of a third embodiment of a knock sensor according to the invention.

Referring now to in FIG. 3, a sensor 210 including an support member 218 press-fit into a base 212 is shown. The support member 218 has a first end 220 having threads for receiving a nut 108. A disk spring 226 is positioned atop load washer 244. The nut 108 is torqued to provide a desired compressive force to the disk spring 226 and ultimately to a plurality of knock sensor components supported on the base 212.

Figure 4:
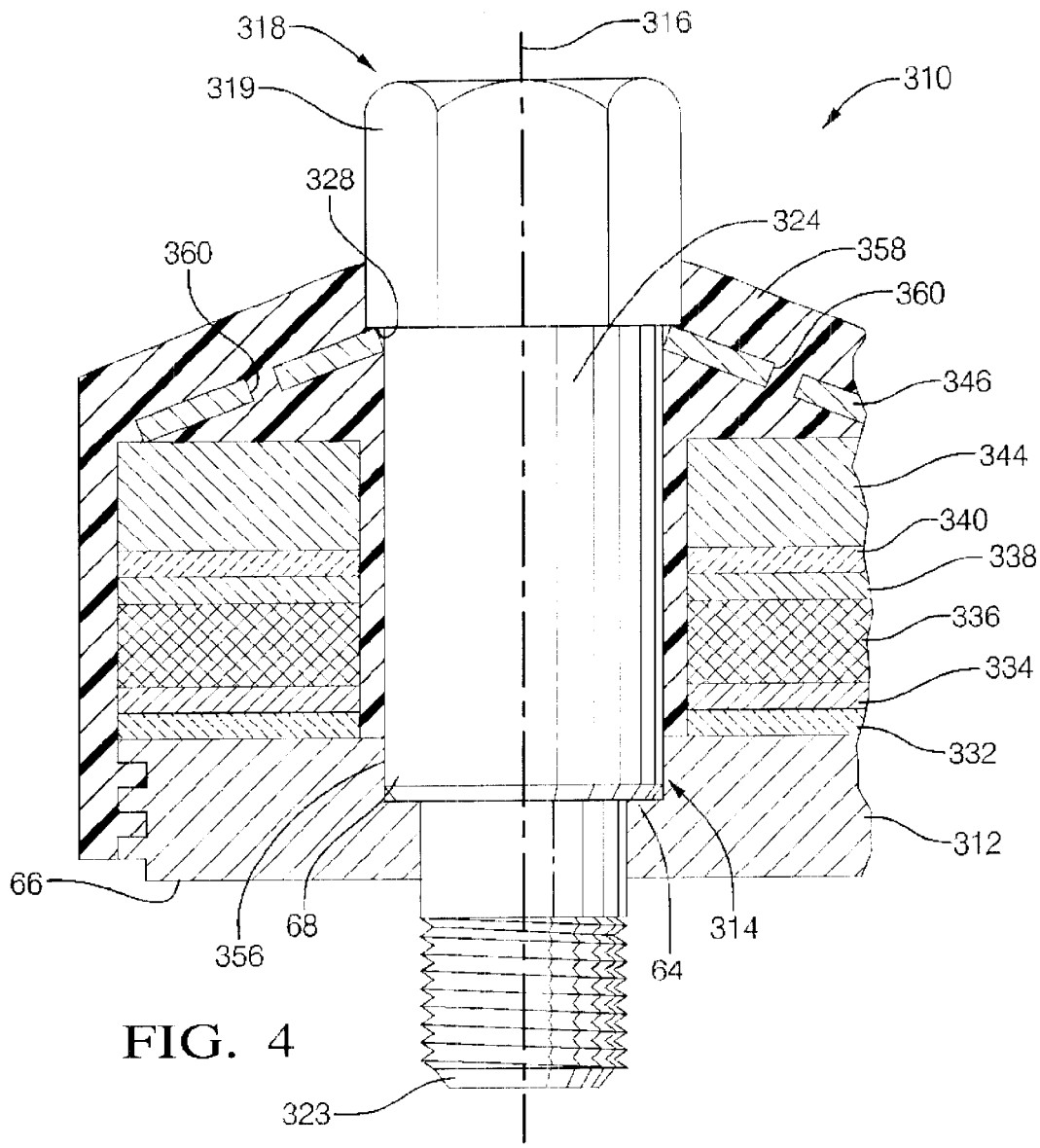
FIG. 4 a partial cross-sectional view of a fourth embodiment of a knock sensor according to the invention.

Referring now to FIG. 4, a sensor 310 that includes a support member 318 and a base 312 having an aperture 314 formed on an axis 316 is shown. An annular shoulder 64 radially extends into the aperture 314 and acts as a stop and support for the support member 318.

The support member 318 is a bolt-like member including a head 319, threaded end 323 opposite the head 319, and a body 324 formed therebetween. The head 319 of the support member 318, has an outer diameter greater than the outer diameter of the body 324 and includes a surface 328 extending generally perpendicular to the axis 316. The threaded end 323 of the support member 318 has a smaller outer diameter than the outer diameter of the body 324 and extends along axis 316 sufficiently beyond an outer surface 66 of the base 312 so as to permit the threaded end 323 of the support member 318 to be engaged with a threaded aperture in an engine block surface (not shown) to secure the sensor 310 to the engine block without the need for additional fasteners. The fastening means, in this case threaded end 323, is integral with the support member 318.

The support member 318 of the sensor 310 can be inserted into the aperture 314 formed in base 312 until a shoulder 368 of the support member 318 engages the annular shoulder 64 of the base 312. The base 312 of the knock sensor 310 supports a plurality of disk-shaped knock sensor components, including a first insulator 332, a first terminal 334, a piezoelectric transducer 336, a second terminal 338, and a second insulator 340. Since preferred operation of the knock sensor 310 is enhanced by maintaining a predetermined compressive force on the piezoelectric transducer 336, a load washer 344 is positioned on top of the knock sensor components. A frusto-conical disk spring (sometimes referred to as a Belleville washer) 346, is positioned between the load washer 344 and the surface 328 of the head 319 of the support member 318 to maintain a compressive load on the sensor components.

The base 312 and the support member 318 of the present invention are designed for press fit engagement at joint 356.

In particular, the body 324 of the support member 318 is pressed into the aperture 314 of the base 312 and a desired number of sensor components can be sheathed onto the support member 318. Since the base 312 and support member 318 are separably joined, the knock sensor 310 of the present invention can be assembled in several ways. For example, the disk spring 346 can be installed over the head 319 of the member 318, in which case, the spring 346 should include about an inner periphery means for reducing the stress about the periphery so that the disk spring 346 is expandable over the head 319 during installation. Belleville washers suitable for this purpose are known to those skilled in the art and can be provided with semi-circular cut-outs or slits radially disposed about the inner periphery of the disk spring 346 to facilitate placement. An alternative method of assembling the knock sensor 310 can include placing the disk spring 346 over the threaded end 323 of the support member 318 before the support member 318 and base 312 are engaged at press fit joint 356, in which case, the disk spring 346 does not require any stress-reducing cut-outs or slits.

With the disk spring 346 positioned between the surface 328 of the head 319 and the load washer 344, each disk-shaped component (i.e. the first insulator 332, the first terminal 334, the transducer 336, the second terminal 338, and second insulator 340), can be stacked around the body 324 of the support member 318. Finally, the base 312 can be joined or assembled to the support member 318 by press-fitting the body 324 of the support member 318 within the aperture 314 of the base 312 until the base 312 and support member 318 abut one another at shoulders 64 and 368 to bring the knock sensor components into operative engagement with one another.

To assist in retaining the components in operative engagement with one another over the life of the knock sensor 310, a plastic housing 358 can be molded over the various elements of the sensor 310. The plastic housing 358 prevents decompression of the disk spring 346 and enhances the integrity of the sensor components. To this end, the disk spring 346 is provided with at least one, but preferably two or more apertures 360 formed adjacent the axis 316 to allow the molten plastic to flow past the disk spring 346 to the base 312. During the molding process, at least a portion of the head 319 of the support member 318 preferably extends beyond the plastic housing 358 to provide sufficient surface area to engage the head 319 when tightening the knock sensor 310 to the engine block (not shown).

Figure 5:
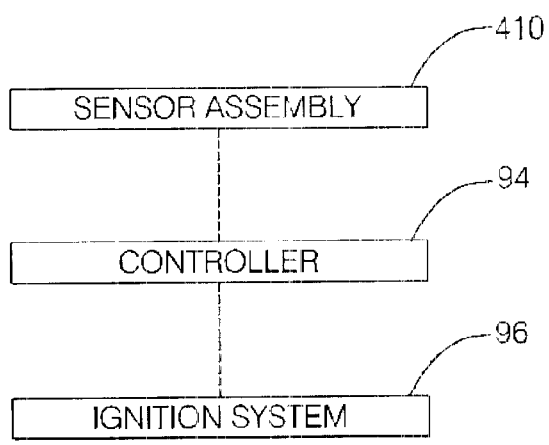
FIG. 5 is a schematic drawing illustrating the communication between a knock sensor, a controller and an ignition system of a vehicle according to the invention.

Referring to FIG. 5, a schematic diagram of an engine control system incorporating the knock sensor is shown. The knock sensor 410 is electrically connected with a controller 94. The controller 94 is, in turn, in electrical communication with an ignition system 96 of a vehicle. When the knock sensor 410 senses conditions corresponding to engine knock, the knock sensor 410 emits a signal to the controller 94 that controls the ignition system of the vehicle to vary the timing of the engine to eliminate the knock.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A knock sensor comprising:
    a base having an aperture,
    a press-fit support member assembled with respect to the aperture in the base to define a sleeve assembly;
    at least one knock sensor component sheathed with respect to a portion of the support member; and
    means associated with the support member for maintaining the at least one knock sensor component in predetermined relation to the base.

2. The knock sensor of claim 1 further comprising:
    the press-fit support member defining a tube.

3. The knock sensor of claim 1 further comprising:
    the press-fit support member defining a bolt.

4. The knock sensor of claim 1 further comprising:
    maintaining means including a lip defined at a first end of the press fit support member opposite the base; and
    a disk spring positioned between the lip of the support member and the at least one knock sensor component.

5. The knock sensor of claim 4 further comprising:
    the disk spring including an aperture providing a passageway for molten plastic to pass through the disk spring for filling a cavity defined between to the at least one knock sensor component and the support member.

6. The knock sensor of claim 1 further comprising:
    means for securing the sleeve assembly to an engine block.

7. The knock sensor of claim 6 further comprising:
    securing means is integral with the support member.

8. The knock sensor of claim 6 further comprising:
    securing means including a fastener.

9. The knock sensor of claim 8 further comprising:
    the fastener is a bolt engageable with said engine block.

10. The knock sensor of claim 1 further comprising:
    a housing enclosing the at least one knock sensor component with respect to the base and support member.

11. The knock sensor of claim 10 wherein said housing is molded plastic.

12. The knock sensor of claim 1 in combination with an engine control system comprising:
    at least one controller; and
    at least one ignition system electronically connected to the controller, wherein the sleeve assembly is a two-piece sleeve assembly electrically connected to the controller.

13. The knock sensor of claim 12, wherein the two-piece sleeve assembly includes a press-fit joint.

* * * * *